United States Patent
Montz et al.

(10) Patent No.: US 8,170,528 B2
(45) Date of Patent: May 1, 2012

(54) NETWORK ACCESS CONTROL

(75) Inventors: Mark Montz, Omaha, NE (US); Michael Kelly, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 295 days.

(21) Appl. No.: 12/576,728

(22) Filed: Oct. 9, 2009

(65) Prior Publication Data

US 2011/0086612 A1    Apr. 14, 2011

(51) Int. Cl.
*H04M 1/66* (2006.01)
(52) U.S. Cl. .......................................... 455/410; 455/411
(58) Field of Classification Search ................... 455/411
See application file for complete search history.

(56) References Cited

U.S. PATENT DOCUMENTS

| | | | |
|---|---|---|---|
| 7,886,962 B2 * | 2/2011 | Vawter | 235/379 |
| 2004/0203666 A1 | 10/2004 | Foster et al. | |
| 2006/0235796 A1 * | 10/2006 | Johnson et al. | 705/44 |
| 2007/0049248 A1 * | 3/2007 | Dawson et al. | 455/410 |
| 2009/0217038 A1 | 8/2009 | Lehtovirta et al. | |
| 2009/0286512 A1 * | 11/2009 | Huber et al. | 455/411 |

FOREIGN PATENT DOCUMENTS

EP  1445893 A2  8/2004

\* cited by examiner

*Primary Examiner* — Nick Corsaro
*Assistant Examiner* — Joel Ajayi

(57) ABSTRACT

According to one embodiment of the present invention, there is provided a method of authorizing a communication device to connect to a network. The method comprises receiving, at a processor, a communication device identifier and a subscriber identifier, determining, by the processor, whether the received communication device identifier is associated with the received subscriber identifier in a data store. Where it is determined that the received identifiers are not so associated the method further comprise requesting, by the processor, a security token associated with the communication device, receiving, at the processor, a security token, determining, by the processor, whether the received security token matches a stored security token associated with the received communication device identifier in the data store, and where it is so determined, authorizing the communication device to connect to the network.

18 Claims, 2 Drawing Sheets

NETWORK ACCESS CONTROL

BACKGROUND

Theft of mobile communication devices, such as mobile telephones, has long been a problem. This is due largely to their relatively small size, their mobility, and their resale value. As mobile communication devices become increasingly sophisticated, so their retail value typically increases. The downside of this, however, is that their attractiveness to thieves also grows.

Despite numerous security measures being in place, the theft of mobile communication devices continues to be a major problem.

BRIEF DESCRIPTION

Embodiments of the invention will now be described, by way of non-limiting example only, with reference to the accompanying drawings, in which.

SUMMARY OF THE INVENTION

Figure 1:
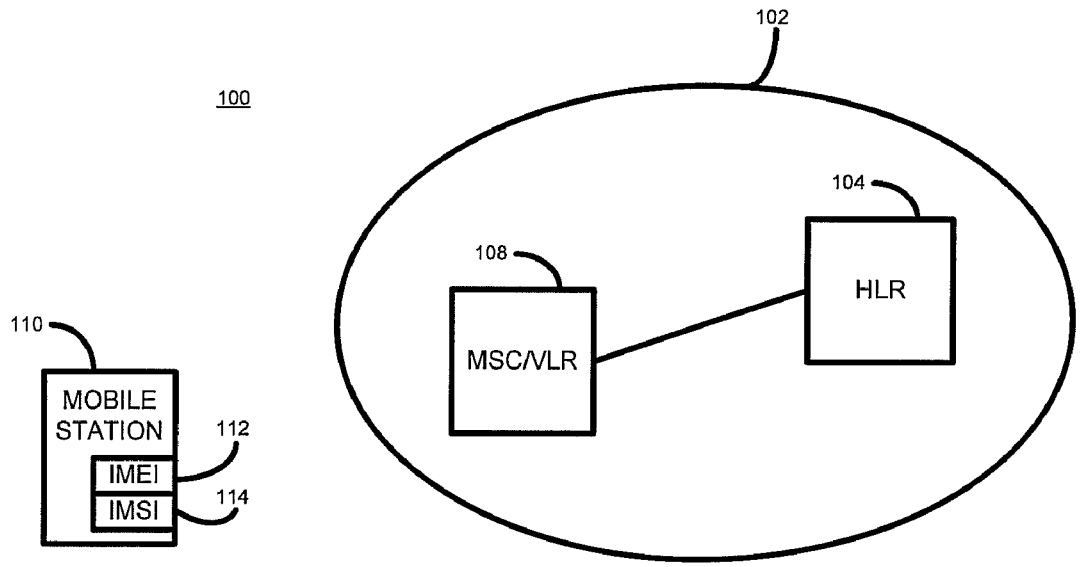
FIG. 1 is a simplified block diagram of a communication network according to the prior art.

According to one embodiment of the present invention, there is provided a method of authorizing a communication device to connect to a network. The method comprises receiving, at a processor, a communication device identifier and a subscriber identifier, determining, by the processor, whether the received communication device identifier is associated with the received subscriber identifier in a data store. Where it is determined that the received identifiers are not so associated the method further comprise requesting, by the processor, a security token associated with the communication device, receiving, at the processor, a security token, determining, by the processor, whether the received security token matches a stored security token associated with the received communication device identifier in the data store, and where it is so determined, authorizing the communication device to connect to the network.

According to further embodiment of the present invention, there is provided apparatus for controlling access of a communication device to a network, the communication device having a hardware identifier and an associated subscriber identifier. The apparatus comprises a message interface configured to receive the hardware identifier and the subscriber identifier from the communication device, a first processing module configured to determine whether the received hardware identifier and subscriber identifier are associated with one another in a data store. The apparatus further comprises a communication module configured to request a security token from the communication device and to receive a security token from the communication device. The apparatus further comprises a second processing module configured to determine whether a received security token matches a security token associated with the received hardware identifier in the data store, and to authorize the communication device to access the network where it is determined that the received security token so matches.

DETAILED DESCRIPTION

The following description is made primarily with reference to the GSM communication system. Those skilled in the art will appreciate, however, that the techniques and systems described below may also be applied to other communication systems, for example third generation (3G) networks and Internet protocol multimedia subsystem (IMS) networks, in the same or similar manners.

Communication devices for use on the GSM network are manufactured with a unique hardware identifier, known as the International Mobile Equipment Identifier (IMEI). Each communication device is also associated with a unique subscriber identifier, known as an international mobile subscriber identifier (IMSI,) which uniquely identifies a subscriber of a communication network. In GSM communication networks the IMSI is stored on a subscriber identity module (SIM) card that is provided by the operator of the communication network.

Whenever a communication device attempts to attach or connect to a communication network the IMEI and IMSI are sent to the communication network. The received IMEI can be checked against an electronic equipment register (EIR) that maintains a list of known stolen IMEIs, and network access to known stolen devices can thus be blocked. However, the IMEI of a communication device is only entered in an EIR when the device is reported lost or stolen by the owner. As a consequence, stolen devices may often be used for some time before blocked by the network operator.

Many communication devices supplied by network operators are also SIM-locked so that they may be used only with subscriber identity modules (SIM) cards provided by the network operator. Although not originally intended as an anti-theft measure, this does, in theory at least, reduce the value of a stolen handset since the communication device will only work on the network of the network operator who originally provided the communication device. However, communication devices may, in general, be de-SIM-locked relatively easily, thereby enabling stolen communication devices to be used on any compatible communication network.

Many communication devices are also provided with local device-based security features that prompt a user for a predetermined PIN code each time a communication device is powered on. Many communication devices also provide a device-based security feature that prompts a user for a predetermined PIN code whenever a different SIM card is used with the device. However, such features are somewhat inconvenient to users. Furthermore, since users are prone to forget such PIN codes communication devices are designed to accept master security reset codes, for example provided by network operators, to enable such security features to be reset. However, such unlocking codes are generally fairly straightforward to obtain, for example through the Internet, enabling such security features to be overcome without great difficulty.

Referring now to FIG. 1 there is shown a simplified block diagram of a mobile communication system 100 according to the prior art. The communication system 100 comprises a mobile communication network 102, such as a GSM, 3G, or other such mobile communication network, which is accessible by a compatible mobile communication device 110.

The mobile communication device 110 may suitably be, for example, a mobile telephone, smartphone, personal digital assistant, a laptop, net-book or note-book computing device, or the like, having an appropriate communication module configured to enable communication with the mobile communication network 102. The mobile device 110 may connect to the network 102 through an appropriate wireless interface (not shown), as will be appreciated by those skilled in the art.

The mobile device 110 includes a unique hardware identifier 112, such as an international mobile equipment identifier (IMEI), which uniquely identifies the mobile device 110. The mobile device 110 is also associated with a unique subscriber identifier 114, such as an international mobile subscriber identifier (IMSI) which uniquely identifies a subscriber of the mobile network 102. In GSM communication networks the IMSI is stored on a subscriber identity module (SIM) card that is provided by the operator of the network 102. The SIM card is arranged in electronic communication with the mobile device, for example by inserting the SIM card into an appropriate slot of the mobile device. In other communication networks the subscriber identifier may be stored permanently within the communication device itself.

The mobile device 110 connects to the network 102 by sending a registration request message to the network 102 via a base transceiver station (BTS) and base station controller (BSC) (not shown). The registration request message includes the IMEI 112 and the IMSI 114.

A mobile switching center (MSC) 108 receives the registration request message from the mobile device 110. In response to receiving the registration request, the MSC 108 sends a corresponding registration request message, including the received IMEI 112 and the IMSI 114, to a home location register (HLR) 104 associated with the subscriber of the mobile device 110.

The HLR 104 checks that the subscriber associated with the received IMSI is a valid subscriber and is authorized to connect to the network 102. If the HLR 104 authorizes the subscriber to connect to the network 102 the HLR informs the MSC 108, through appropriate signaling messages, and the MSC 108 connects the mobile device 110 to the network 102. Thereafter, the mobile device 110 may make appropriate use of the network 102.

Prior to connecting the mobile device 110 to the network 102 the MSC 108 may additionally check whether the received IMEI of the mobile device 110 is listed as a stolen or barred device in a so-called 'black-list' of an electronic identity register (EIR). If the IMEI of the mobile device 110 is listed therein, the MSC 108 does not connect the mobile device 110 to the network 102.

Embodiments of the present invention aim to provide a new and secure security system to control access to a communication network and to prevent communication devices from being used by unauthorized subscribers, as described below in further detail.

Figure 2:
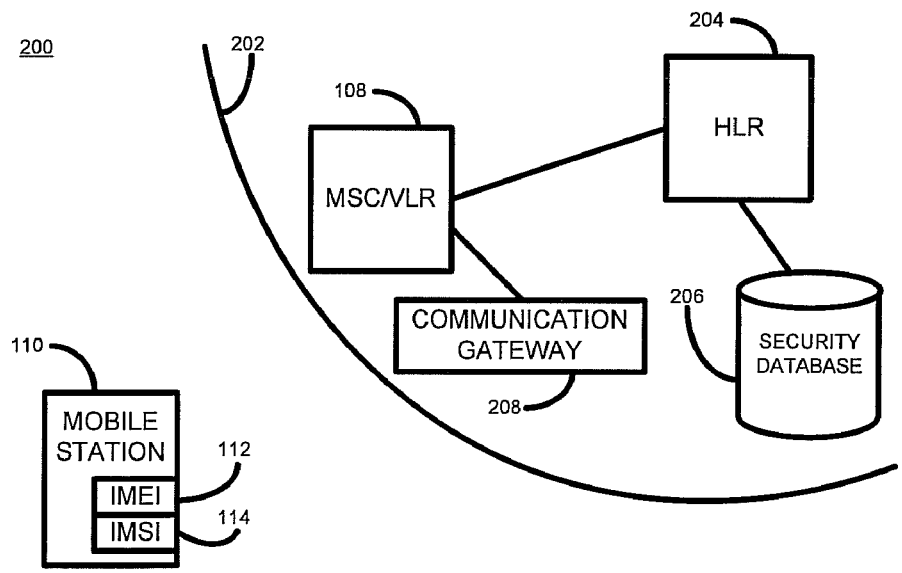
FIG. 2 is a simplified block diagram of a communication network according to an embodiment of the present invention.

Referring now to FIG. 2, there is shown a simplified block diagram of a mobile communication system 200 according to an embodiment of the present invention. Common reference numerals in the drawings indicate common or like elements.

In the present embodiment a communication network 202 includes a mobile switching center 108, and a home location register (HLR) 204. The HLR 204 has access to a security database 206 that is used in determining whether a request to connect a mobile device to the network 202 may be granted, as described in further detail below.

The security database 206 stores details of the IMEIs of mobile communication devices that are authorized to connect to or access the network 202. With each IMEI is associated a security token, such as a personal identification number (PIN), an alphanumeric code, identifier, or suitable security code. It should be noted that the IMEI security token stored in the security database is independent from any local device-based security code.

In the present embodiment the security token associated with each IMEI is initially generated by the operator of the network 202. The security token associated with an IMEI may be retrieved and subsequently modified by the registered owner of the communication device having that IMEI through an appropriate interface, such as a web interface, through use of an unstructured supplemental service data (USSD) or short message system (SMS) interface, or by contacting a customer services hotline.

In the security database 208, each IMEI is also associated one or more subscriber identifiers, such as an IMSI, with which the communication device is authorized to be used. The IMSIs associated with an IMEI may be retrieved and modified by the registered owner of the communication device having that IMEI through any appropriate interface, such as those described above.

An example set of entries in the security database is shown below in Table 1.

TABLE 1

Example entries in a security database

| IMEI | IMEI SECURITY TOKEN | REGISTERED IMSIs |
|---|---|---|
| IMEI #1 | 1234 | IMSI #1 |
| IMEI #2 | 5678 | IMSI #5 |
|  |  | IMSI #6 |
|  |  | IMSI #8 |
| IMEI #3 | 2468 | IMSI #9 |
|  |  | IMSI #1 |

In the present embodiment each IMEI entry in the security database is initially populated by the network operator 202, for example upon the purchase of a new mobile device and subscription. For example, for each IMEI in the security database the first IMSI associated therewith may be the subscriber identifier of the subscription package purchased at the time the mobile device having the associated IMEI was purchased.

Figure 3:
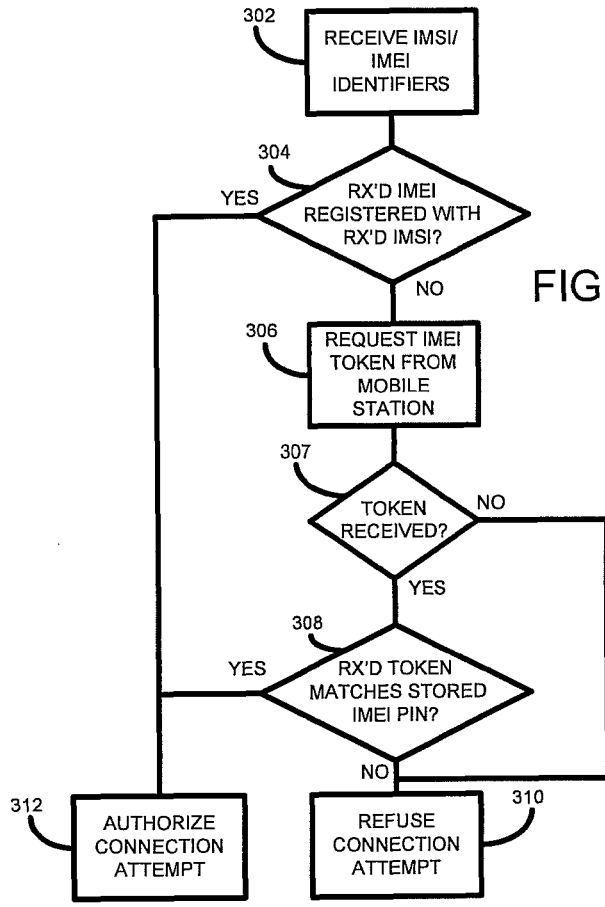
FIG. 3 is a flow diagram outlining example processing steps taken in accordance with an embodiment of the present invention.
Figure 4:
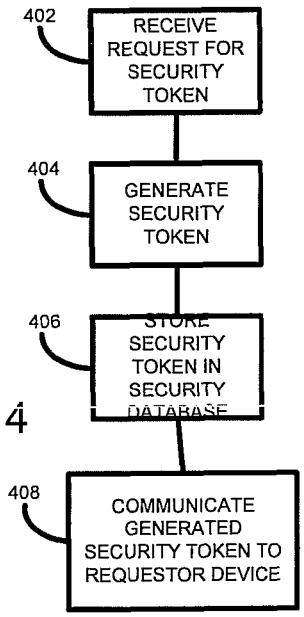
FIG. 4 is a flow diagram outlining example processing steps taken in accordance with an embodiment of the present invention.

The operation of elements of the network 202 according to an embodiment of the present invention will now be described with further reference to FIG. 3.

The HLR 204 receives (step 302), for example at an appropriate message interface, a registration request message from the MSC 108. The HLR 204 then interrogates the security database 206 to determine (step 304), for example using an appropriate processing module or logic, whether the received IMSI and IMEI identifiers are registered or associated with one another. If it is determined that the received IMEI and IMSI are associated with one another, the HLR 204 authorizes (step 312) the connection attempt. For example, if the received IMEI is IMEI #1, and the received IMSI is IMSI #1, it can be determined from the security database (see Table 1) that IMSI #1 is associated with, or registered with, IMEI #1. In this way subscribers who are already authorized in the security database to use a communication device having a given IMEI are automatically authorized by the HLR 204, and therefore are not requested to enter the security token associated with the IMEI of the communication device.

If it is determined that the received IMSI is not registered with the received IMEI, the HLR 204 communicates (step 306), for example using an appropriate communication module, with the mobile communication device 110 making the registration request to request the security token associated with the received IMEI in the security database.

In the present embodiment the HLR 204 communicates with the communication device 110 using an unstructured supplemental service data (USSD) communication module, which is initiated through a USSD gateway 208. Those skilled in the art will appreciate that USSD is supported by all GSM compatible communication devices, and therefore may easily be implemented by network operators, without requiring any modifications to the handsets. In other embodiments other communication protocols may be used to communicate with the communication device, for example Internet protocol (IP) based instant messaging, or the like.

The USSD communication informs the user of the requesting communication device, by way of displaying a textual message on the display of the device, to enter the security token associated with the IMEI of the device in the security database 206. The user enters the security token, using the user interface of the communication device, and sends this to the HLR 204 through the communication gateway 208. If no security token is received (step 307) within a predetermined time period the connection request is refused (step 310).

If a security token is received (step 307) the HLR 204 determines (step 308), for example using an appropriate processing module or logic, whether the received security token matches the security token associated with the IMEI in the security database 206. If it does match, the connection attempt is authorized (step 312), for example using an appropriate processing module or logic. If it does not match the connection attempt is refused (step 310).

If the connection attempt is refused a suitable USSD message may be sent to the communication device 110 to indicate that the connection attempt has been refused. In a further embodiment, the authorized owner of the communication device may be informed, for example through an email message, through a USSD communication, an SMS, a phone call, or the like, that an attempt to connect to a communication network with their communication device has been made. The authorized user may additionally be given the opportunity, for example, to report their communication device stolen to the network operator. In a yet further embodiment, a fraud management system of the network operator may be informed that a connection attempt has been refused.

In a further embodiment, when a connection request is made with an IMSI that is not associated with an IMEI in the security database, and where the security token received in step 307 matches that associated with the IMEI in the security database 206, the IMSI is automatically associated with the IMEI in the security database 206, for example by suitably storing the IMSI with the appropriate IMEI. In this way, any subsequent connection requests having the same IMSI and IMEI will be automatically authorized (steps 304 and 312) by the HLR, thereby avoiding the user from having to re-enter the security token each time the same IMEI and IMSI are used together.

The IMSI added to the security database may be permanently added thereto to enable any future connection attempts between the newly associated IMSI and the IMEI to be automatically authorized by the HLR 204. In an alternative embodiment, the newly associated IMSI may be temporarily added to the security database, for example by storing an associated validity date and time with the newly associated IMSI. In this way, for example, a newly associated IMSI may be only authorized to connect to the network 202 with an IMEI during a predetermined period of time.

In a further embodiment, the security token associated with an IMEI is generated, by the HLR 204, upon demand by the registered owner of the communication device having the IMEI. For example, before a user allows a different subscriber to use his communication device, the authorized owner of the device makes a request for a one-time or temporary security token from the HLR. The security token may be requested and obtained through any suitable interface, such as through USSD, SMS, a telephone call, etc.

When the request for a security token is received (step 402) the HLR 204, for example through an appropriate processor module or logic, determines (step 402) the identifier of the communication device being used to make the request. The HLR 204 then generates (step 404), for example using an appropriate processor module or logic, a temporary security token and associates this (step 406), for example using an appropriate processor module or logic, with the determined communication device identifier in the security database 206 along with a validity time and date after which the security token is deemed expired. The validity period may be predetermined to any suitable period depending on the level of security required. The validity period should, however, be at least long enough to enable a subscriber not registered with the IMEI in the security device to connect to the network 202 and to correctly provide the temporary security token when requested by the HLR 204. The generated security token is then communicated (step 408), for example using an appropriate communication module or logic, to the communication device having made the request in an appropriate manner, so that it may be transmitted to a different subscriber who is to be authorized to used the communication device.

In a yet further embodiment, the HLR 204 is configured to only associate and to store a predetermined number of IMSIs with each IMEI in the security database 206. For example, the HLR 204 may only allow a single IMSI to be associated with each IMEI at any one time, or may allow multiple IMSIs to be associated with each IMEI. In this way, the IMEI and IMSI of the last connection attempt authorized in step 312 are stored. Subsequent connection attempts having the same IMEI and IMSI pair will therefore be automatically authorized by the HLR 204 (steps 304 and 312). However, a connection attempt having a non-associated IMSI and IMEI will cause the security token associated with the IMEI to be requested (step 306) from the user of the communication device before the connection attempt can be authorized.

Those skilled in the art will appreciate that the above-described embodiments are exemplary only, and that further embodiments encompassing other modifications or alternatives may be envisaged.

Reference herein to IMEIs is not limited thereto, and may encompass other suitable equipment identifiers.

Reference herein to IMSIs is not limited thereto, and may encompass other suitable subscriber identifiers.

Reference herein to home location registers is not limited thereto, and may encompass other suitable network management modules or elements, such as home subscriber servers (HSS) or other such network connection authorization elements, that determine whether a communication device is authorized to connect to a network.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

For example, in one embodiment the HLR 204 may be suitably be implemented using a processor, the processor having memory couple to or in electronic communication with the processor, and computer executable instructions being stored in the memory and executable on the processor to perform method steps described above.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of authorizing a communication device to connect to a network comprising:
   receiving, at a processor, a communication device identifier and a subscriber identifier;
   determining, by the processor, whether the received communication device identifier is associated with the received subscriber identifier in a data store;
   requesting, by the processor, where it is determined that the received communication device identifier is not associated with the received subscriber identifier, a security token associated with the communication device;
   receiving, at the processor, a security token;
   determining, by the processor, whether the received security token matches a stored security token associated with the received communication device identifier in the data store; and
   where it is determined that the received security token matches the stored security token, authorizing the communication device to connect to the network.

2. The method of claim 1, further comprising, where it is determined that the received security token matches the stored security token, associating, by the processor, the received subscriber identifier with the received communication device identifier in the data store.

3. The method of claim 1, wherein the step of requesting a security token further comprises communicating, by the processor, with the communication device and requesting the security token through the communication device.

4. The method of claim 1, wherein the communication device identifier and the subscriber identifier are received at the processor in a connection request message sent by the communication device.

5. The method of claim 1, wherein the method is performed by a network connection authorization element.

6. The method of claim 2, further comprising associating a validity period with the subscriber identifier and wherein the step of determining whether the received communication device identifier is associated with the received subscriber identifier in the data store additionally determines whether the validity period has expired.

7. The method of claim 1, further comprising associating a validity period with the stored security token, and wherein the step of determining whether the received security token matches a stored security token further comprises determining whether the validity period associated with the stored security token has expired.

8. The method of claim 1, further comprising informing the registered owner of the communication device where it is determined that the received security token does not match the security token associated with the identifier of the communication device in the data store.

9. The method of claim 1, wherein the network is mobile telephony network, and wherein the step of requesting and receiving a security token is performed using an unstructured supplemental service data (USSD) communication.

10. Apparatus for controlling access of a communication device to a network, the communication device having a hardware identifier and an associated subscriber identifier, comprising:
    a message interface to receive the hardware identifier and the subscriber identifier from the communication device;
    a first processing module to determine whether the received hardware identifier and subscriber identifier are associated with one another in a data store;
    a communication module to:
       request a security token from the communication device if it is determined that the received hardware identifier and subscriber identifier are not associated with one another; and
       receive a security token from the communication device; and
    a second processing module to:
       determine whether the received security token matches a stored security token associated with the received hardware identifier in the data store; and
       authorize the communication device to access the network where it is determined that the received security token so matches.

11. The apparatus of claim 10, wherein the second processing module is further, where it is determined that the received security token matches the stored security token, to associate the received subscriber identifier with the received communication device identifier in the data store.

12. The apparatus of claim 10, wherein the message interface is to receive the communication device identifier and the subscriber identifier in a connection request message sent from the communication device.

13. The apparatus of claim 11, wherein the second processing module is further to associate a validity period with the subscriber identifier and is still further configured to determine whether the security token matches the stored security token only if the validity period has not expired.

14. The apparatus of claim 10, wherein the second processing module is further to inform the registered owner of the communication device where it is determined that the received security token does not match the security token associated with the identifier of the communication device in the data store.

15. The apparatus of claim 10, configured to operate within a mobile telephony network.

16. The apparatus of claim 15, wherein the communication module is to use the unstructured supplemental service data (USSD) communication protocol.

17. A computing device, comprising:
a processor,
a memory in communication with the processor, and
computer executable instructions stored in the memory and executable on the processor to:
   receive a communication device identifier;
   receive a subscriber identifier;
   determine whether the received communication device identifier is associated with the received subscriber identifier in a data store; and
   request, where it is determined that the received communication device identifier is not associated with the received subscriber identifier, a security token associated with the communication device;
   receive a security token;
   determine whether the received security token matches a stored security token associated with the received communication device identifier; and
   where it is determined that the received security token matches the stored security token, authorize the communication device to connect to the network.

18. A non-transitory computer readable medium storing machine readable instructions, which when executed by a processor perform a method of authorizing a communication device to connect to a network, the machine readable instructions comprising code to:
   receive a communication device identifier;
   receive a subscriber identifier;
   determine whether the received communication device identifier is associated with the received subscriber identifier in a data store; and
   request, where it is determined that the received communication device identifier is not associated with the received subscriber identifier, a security token associated with the communication device;
   receive a security token;
   determine whether the received security token matches a stored security token associated with the received communication device identifier; and
   where it is determined that the received security token matches the stored security token, authorize the communication device to connect to the network.

* * * * *